United States Patent
Qi et al.

(10) Patent No.: US 11,305,260 B2
(45) Date of Patent: Apr. 19, 2022

(54) CATALYST FOR GASOLINE ENGINE EXHAUST GAS AFTERTREATMENT

(71) Applicant: BASF Corporation, Florham Park, NJ (US)

(72) Inventors: Yun Fei Qi, Shanghai (CN); Jun Cong Jiang, Shanghai (CN); Shau Lin Chen, Shanghai (CN); Weiyong Tang, Shanghai (CN); Yu Lin Qiu, Shanghai (CN); Liang Fang Lv, Shanghai (CN); Yan Zhu Lei, Shanghai (CN)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/975,611

(22) PCT Filed: Feb. 22, 2019

(86) PCT No.: PCT/CN2019/075786
§ 371 (c)(1),
(2) Date: Aug. 25, 2020

(87) PCT Pub. No.: WO2019/161775
PCT Pub. Date: Aug. 29, 2019

(65) Prior Publication Data
US 2020/0406234 A1 Dec. 31, 2020

(30) Foreign Application Priority Data
Feb. 26, 2018 (WO) ................ PCT/CN2018/077268

(51) Int. Cl.
| | | |
|---|---|---|
| *B01D 53/94* | (2006.01) | |
| *B01J 23/46* | (2006.01) | |
| *B01J 35/04* | (2006.01) | |
| *B01J 35/10* | (2006.01) | |
| *B01J 37/02* | (2006.01) | |
| *F01N 3/10* | (2006.01) | |
| *F01N 3/22* | (2006.01) | |
| *F01N 3/28* | (2006.01) | |
| *B01J 37/08* | (2006.01) | |
| *F01N 3/022* | (2006.01) | |

(52) U.S. Cl.
CPC .......... *B01J 23/464* (2013.01); *B01D 53/945* (2013.01); *B01J 35/04* (2013.01); *B01J 35/1076* (2013.01); *B01J 37/0201* (2013.01); *B01J 37/024* (2013.01); *B01J 37/088* (2013.01); *F01N 3/0222* (2013.01); *F01N 3/101* (2013.01); *F01N 3/2825* (2013.01); *B01D 2255/1021* (2013.01); *B01D 2255/1025* (2013.01); *B01D 2255/9155* (2013.01); *B01D 2255/9202* (2013.01); *F01N 2330/06* (2013.01); *F01N 2330/32* (2013.01); *F01N 2370/02* (2013.01)

(58) Field of Classification Search
CPC .............. B01D 53/9445; B01D 53/945; B01D 46/2418; B01D 2255/102; B01D 2255/915; B01D 2255/9155; B01D 2258/012; B01D 2258/014; B01J 23/40; B01J 23/89; B01J 37/02; B01J 37/0215; F01N 3/035; F01N 3/101; F01N 2250/02
See application file for complete search history.

(56) References Cited

U.S. PATENT DOCUMENTS

| | | | |
|---|---|---|---|
| 6,464,946 B1 * | 10/2002 | Yamada | .................... B01J 23/63 422/177 |
| 6,479,023 B1 | 11/2002 | Evans et al. | |
| 7,977,275 B2 | 7/2011 | Pfeifer et al. | |
| 8,173,087 B2 | 5/2012 | Wei et al. | |
| 8,506,892 B2 | 8/2013 | Kim et al. | |
| 9,687,818 B2 | 6/2017 | Siani et al. | |
| 2002/0013226 A1 * | 1/2002 | Maunula | ................ F01N 3/0842 502/302 |
| 2005/0170955 A1 * | 8/2005 | Nakamura | ........... B01D 53/945 502/325 |
| 2011/0033353 A1 | 2/2011 | Siani et al. | |
| 2015/0252708 A1 * | 9/2015 | Brown | ................ B01D 53/9445 423/212 |
| 2019/0009254 A1 * | 1/2019 | Clowes | ..................... B01J 35/04 |

FOREIGN PATENT DOCUMENTS

| | | | | |
|---|---|---|---|---|
| CN | 102574106 A | | 7/2012 | |
| CN | 107715875 A | * | 2/2018 | .............. B01J 23/63 |
| EP | 2 589 427 A2 | * | 5/2013 | .............. B01J 29/06 |
| WO | WO 2007/049851 A1 | | 5/2007 | |

OTHER PUBLICATIONS

International Search Report dated May 29, 2019 in PCT/CN2019/075786 filed Feb. 22, 2019.

* cited by examiner

*Primary Examiner* — Timothy C Vanoy
(74) *Attorney, Agent, or Firm* — Finnegan, Henderson, Farabow, Garrett & Dunner, LLP

(57) ABSTRACT

A catalyst for gasoline engine exhaust gas after-treatment, comprising Pt and optionally at least one other platinum group metal on a hydrothermal stable support material which is coated onto a gasoline particulate filter. The catalyst oxidizes particulate matter trapped in the gasoline particulate filter under low temperature and abates $NO_x$, CO and HC. Also a process for preparing the catalyst is disclosed, and a method for after-treatment of gasoline engine exhaust gas using the catalyst is disclosed.

18 Claims, 3 Drawing Sheets

CATALYST FOR GASOLINE ENGINE EXHAUST GAS AFTERTREATMENT

TECHNICAL FIELD

The present invention relates to a catalyst composition for gasoline engine exhaust gas aftertreatment. The catalyst composition is coated onto a gasoline particulate filter to oxidize particulate matter trapped in the filter at low temperatures and to abate nitrogen oxides, carbon monoxide, and hydrocarbons.

BACKGROUND

Recently, emerging environmental problems such as haze and smog have become increasingly challenging. Stricter emission criteria are already required or will be required to improve the environmental conditions by further limiting emissions, such as nitrogen oxides ($NO_x$), carbon monoxide (CO), hydrocarbon (HC) and particulate matter (PM), etc., from internal combustion engines of gasoline powered vehicles.

Exhaust gases may be passed through a gasoline particulate filter (GPF) coated with catalyst washcoat to remove PM before the exhaust gases are emitted into the atmosphere. For gasoline powered vehicles operating at stoichiometric air/fuel conditions, usually there is no constant excessive oxygen supply to burn off the accumulated soot.

U.S. Pat. No. 8,173,087 provides three-way conversion (TWC) catalysts or oxidation catalysts, coated onto particulate traps such as soot filters. More specifically, it is directed to a soot filter having a catalytic material was prepared using two coats: an inlet coat and an outlet coat. The three-way conversion (TWC) catalyst composite contained palladium and rhodium or platinum and palladium with a total precious metal loading in the range of 26 to 68 $g/ft^3$.

U.S. Pat. No. 7,977,275 relates to a catalytically coated particulate filter and to its use for removing carbon monoxide, hydrocarbons and soot particles from the exhaust gas. It provides a combination of platinum and palladium to provide optimum properties in terms of resistance to ageing and sulphur poisoning. To meet the requirement of the conversion of hydrocarbons and carbon monoxide in the test cycle, an increased precious metal concentration with a total precious metal loading of 100 $g/ft^3$ is provided.

However, accumulated PM can block the filter, leading to a drop in the engine efficiency. Thus, regeneration needs to be periodically performed by burning PM on the GPF above 600° C. to consistently maintain the engine performance, which is also accompanied by a side effect of filter damage. It is also necessary to reduce the utilization of precious metal.

Locating a four-way catalyst (FWC) at a close-coupled (CC) position where the temperature of the exhaust gas could reach 600° C. makes soot burning with oxygen during lean NF conditions feasible and fast. However, this method is restricted by the limited space available in the engine compartment and by a higher back pressure caused by higher volumetric flow rate under high temperature conditions. Therefore, arranging a FWC at an under floor (UF) position is preferred. In such a layout, the effective oxidization of gasoline PM at temperatures of 550° C. becomes a main problem to be resolved.

Measures, such as adding double insulated pipe between CC catalyst and the under-floor catalyst (UFC) may be employed to increase the temperature of UFC during lean air/fuel (NF) conditions to facilitate oxidization of collected PM, but such measures only generate limited improvement by increasing catalyst temperature about 50° C., while significantly increasing the cost.

U.S. Pat. No. 6,479,023 provides a system for converting PM in exhaust gases from a stoichiometrically operated engine. The system includes a plasma generator for converting water vapor in the exhaust gases into an oxidant and a filter downstream of the plasma generator. However, this method is energy intensive, and the plasma generates other pollutants, such as $NO_x$.

Therefore, it is desirable to provide a catalyst that oxidizes soot to remove PM collected on the GPF at low temperatures (e.g. in the range of 250 to 550° C.) at the UF position. Preferably, the catalyst also converts $NO_x$, CO and HC to $N_2$, $CO_2$ and $H_2O$.

It has now been found that catalysts contain a combination of platinum and rhodium, optionally with palladium have particularly favorable properties in removing PM collected on the GPF at low temperatures at the UF position. The particulate filter retains a good catalytic activity over its entire service life and can completely convert the large quantities of $NO_x$, CO and HC to $N_2$, $CO_2$ and $H_2O$.

However, it is not only the precious metals which are responsible for the catalytic activity of the catalytic coating, but rather the support materials used also play an important role in this context. The support materials of the first and second catalyst may be identical or different. They are preferably selected from a group of support materials which consists of alumina, zirconia, ceria, silica, titania, a rare earth metal oxide other than ceria and mixtures thereof.

SUMMARY OF THE INVENTION

An object of the present invention is to provide a catalyst coated onto a GPF to oxidize and remove PM collected on the GPF at low temperatures (e.g., in the range of 250 to 550° C.) at the UF position. Preferably, the catalyst also converts $NO_x$, CO and HC to $N_2$, $CO_2$ and $H_2O$.

A first aspect of the invention provides a catalyst coated onto a GPF to oxidize and remove PM collected on the GPF at low temperatures (e.g., in the range of 250 to 550° C.) at the UF position. Preferably, the catalyst also converts $NO_x$, CO and HC to $N_2$, $CO_2$ and $H_2O$.

A second aspect of the invention provides a process for preparing the catalyst of the present invention.

A third aspect of the invention provides a method for the removal of PM collected on the GPF at low temperatures (e.g., in the range of 250 to 550° C.) at the UF position and the conversion $NO_x$, CO and HC in the gasoline engine exhaust gas to $N_2$, $CO_2$ and $H_2O$. This method comprises contacting the exhaust gas with the catalyst of the present invention.

DETAILED DESCRIPTION OF THE INVENTION

Figure 1:
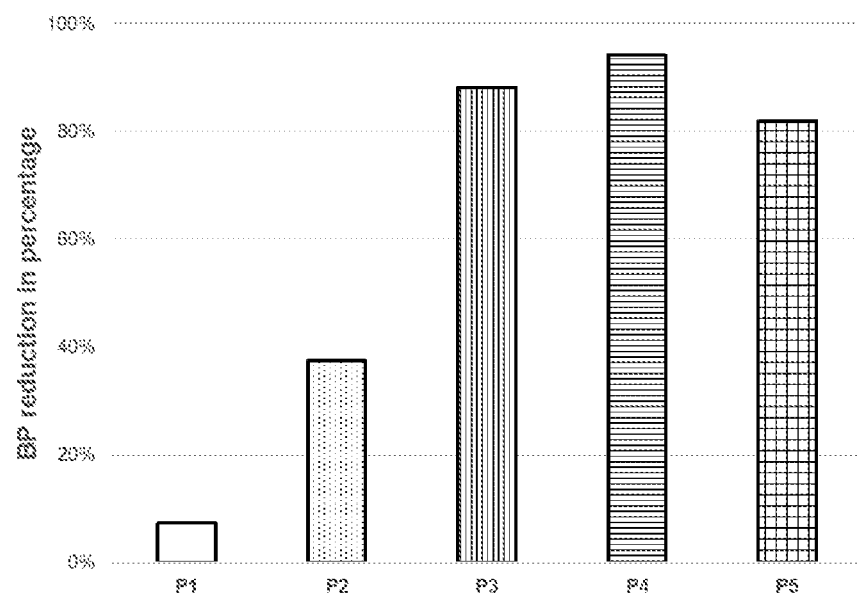
FIG. 1 shows back pressure (BP) reduction in percentage of Examples P1 to P5 due to soot oxidation at 450° C. after 30 min.

The following terms, used in the present description and the appended claims, have the following definitions:

Expressions "a", "an", "the", when used to define a term, include both the plural and singular forms of the term.

All percentages and ratios are mentioned by weight unless otherwise indicated.

"TWC" refers to a three-way catalyst that can substantially eliminate HC, CO and $NO_x$ from gasoline engine exhaust gases. Typically, a TWC mainly consists of one or more platinum-group metals (PGMs), alumina as support material, and cerium-zirconium oxide (Ce—$ZrO_x$) as both an oxygen storage component and a support material coated on ceramic or metallic substrate.

"FWC" refers to a four-way catalyst, which combines the functionality of a TWC with a GPF to remove all four pollutants (HC, CO, $NO_x$ and PM) from gasoline engine exhaust gas. Typically, an FWC is comprised of GPF and coating components on the GPF, which acts as a substrate. An FWC mainly consists of PGM, alumina as support material, and cerium-zirconium oxide (Ce—$ZrO_x$) as both an oxygen storage component and a support material coated on ceramic particulate filter substrate. FWCs in the prior art cannot oxidize PM, especially at low temperatures (e.g. in the range of 250 to 550° C.).

"GPF" refers to a gasoline particulate filter.

"PGM" refers to platinum group metal, while "Pt" refers to platinum, "Pd" refers to palladium, and "Rh" refers to rhodium. It is to be understood that these terms embrace not only the metallic form of these PGMs, but also any metal oxide forms that are catalytically active for emissions reduction. Combinations of metallic and catalytically active metal oxide forms are also contemplated by the invention.

"UFC" refers to an under-floor catalyst.

A GPF placed at the UF position typically gives higher filtration efficiency, which has lower system pressure drops and easier installation compared with a GPF placed at a close-coupled position. However, such UFCs usually stay under 550° C., especially during urban driving, which makes oxidization of soot difficult by oxidants such as $O_2$.

One aspect of this invention is the recognition that removal of PM below 550° C. may be achieved by using an oxidant that is stronger than $O_2$, such as an $NO_2$ oxidant. As used herein, an "$NO_2$ oxidant" includes $NO_2$, $N_2O_5$, $N_2O_4$ and $N_2O_3$. The term "$NO_2$ oxidant" also includes equivalent oxidant, such as $HNO_3$ and $HNO_2$, which may be converted under appropriate catalytic conditions into an oxygen-containing species capable of oxidizing particulate matter, such as soot. In certain embodiments of the invention, nitrogen dioxide ($NO_2$) is a major component in $NO_2$ oxidant. $NO_2$ oxidant used to oxidize the soot on the GPF may be catalytically generated via NO oxidation.

Due to the higher exhaust temperature in gasoline powered vehicles (above 550° C.), if the NO oxidation described above were to be done at a close-coupled position, the result would be quick $NO_2$ oxidant decomposition to form NO and $O_2$, because such decomposition reactions are thermodynamically favored. Meanwhile, higher exhaust temperature and the alternating lean-rich pulses also pose more challenging stability requirement for the materials used in the catalyst.

The exhaust gas from gasoline powered vehicles usually includes NO, $O_2$, CO, $CO_2$, $H_2O$, unburned HC and PM. One aspect of this invention is the recognition that NO may be catalytically converted to $NO_2$ oxidant in quantities sufficient to oxidize soot entrapped in the GPF by using the catalysts of the invention. While the amount of $NO_2$ oxidant present during transient starting conditions is typically low, the amount of $NO_2$ oxidant increases as the NO in the exhaust gas is converted into $NO_2$ oxidant by the catalysts of the invention. Thus, after transient starting conditions, useful amounts of $NO_2$ oxidant in the gas when it contacts the soot entrapped in the GPF will be in the range 5 to 3500 ppm, preferably 20 to 1500 pm, more preferably 20 to 500 ppm, although it is possible that the $NO_2$ oxidant content can be widely varied within and outside this range due to specific engine operation conditions. The essential point is that there is enough $NO_2$ oxidant in the gas to oxidize the soot entrapped in the GPF.

In certain embodiments of this invention, the $NO_2$ oxidant is readily generated over the catalyst in the GPF under typical gasoline engine running conditions and effectively oxidizes the soot at low temperatures (e.g., in the range of 250 to 550° C.). In such embodiments, the back pressure normally caused by PM deposition on the GPF is reduced.

The exhaust gases from stoichiometric-burn engines, such as gasoline engines, are approximately at stoichiometry, meaning that they contain approximately equivalent amount of oxidants and reductants (e.g. CO, $NH_3$ and unburned hydrocarbon, etc.). Thus, the relative amount of oxygen available for NO oxidation is less than the relative amount of oxygen available in constantly lean-burn engines, such as diesel engines. This challenge, however, may be dealt with by proper engine calibration work with fuel-cuts during deceleration or periodic slight lean-burn conditions, in which 02 flushes the exhaust system.

In certain embodiments, the catalyst of the invention may be a mixture of a TWC coated on a GPF, which facilitates gas pollutant conversion, and one or more PGMs which oxidize NO to form $NO_2$ oxidant.

In one embodiment, the catalyst in this invention comprises:
  a) Pt;
  b) at least one hydrothermally stable support material selected from alumina, zirconia, ceria, silica, titania, a rare earth metal oxide other than ceria, and mixtures thereof;
  c) optionally at least one other platinum group metal selected from Rh, Pd, Ru, Ir and mixtures thereof; and
  d) optionally at least one transition group metal selected from Mn, Fe, Co, Ni, Cu and mixtures thereof.

In one preferred embodiment, the catalyst in this invention further comprises at least one functional additive, such as magnesium oxide, calcium oxide, strontium oxide, barium oxide, gallium oxide, indium oxide, germanium oxide, antimony oxide, and mixtures thereof.

In one preferred embodiment, the particle size of Pt in the catalyst in this invention is 2 to 20 nm, preferably 2 to 10 nm, more preferably 5 to 7 nm.

In one or more preferred embodiments, the catalyst may comprise from about 50 wt. % to about 99.9 wt. %, including about 60 wt. % to about 99.8 wt. %, including about 70 wt. % to about 99.6 wt. % of hydrothermally stable support material, based on the calcined weight of the catalyst.

In one or more preferred embodiments, the catalyst may, for example, comprise from about 10 to about 90 wt. % of alumina, preferably from about 15 to about 70 wt. % of alumina, more preferably from about 20 to about 50 wt. % of alumina, based on the calcined weight of the catalyst.

In one or more preferred embodiments, the catalyst may, for example, comprise from about 1 to about 50 wt. % of zirconia, preferably from about 5 to about 40 wt. % of zirconia, more preferably from about 8 to about 30 wt. % of zirconia, based on the calcined weight of the catalyst.

In one or more preferred embodiments, the catalyst may, for example, comprise from about 10 to about 60 wt. % of ceria, preferably from about 15 to about 50 wt. % of ceria, more preferably from about 28 to about 40 wt. % of ceria, based on the calcined weight of the catalyst.

In one preferred embodiment, the particle size distribution of the hydrothermally stable support material in the catalyst in this invention is in the range of 500 nm to 50 μm. The specific surface area of said hydrothermally stable support material is in the range of 30-200 $m^2/g$ at fresh state and 15-150 $m^2/g$ after aging at conditions typical for UFC.

The GPF may be in conventional form and structure. Typically, the GPF comprises alternatingly closed channels that force the exhaust gas flow through porous walls, a ceramic wall-flow filter, a wire mesh filter, a ceramic or SiC foam filter, etc.

In certain embodiments of this invention, the coating of the catalysts onto the GPF may cover the substrate along the whole of or a part of its length, radius, or on alternating channels, or a combination thereof. Additionally, more than one catalyst of the invention may be coated onto one single filter.

The catalyst of the present invention may be prepared by a method comprising the steps of:
a) impregnating Pt and optionally other PGM elements such as Rh, Pd, Ru, or Ir (optionally using one or more precursors thereof) onto the hydrothermally stable support material with sufficient water to achieve incipient wetness and optionally to dilute and/or mix with one or more other components, as described herein, to form an aqueous slurry;
b) milling and coating the slurry onto a gasoline particulate filter; and
c) calcining the gasoline particulate filter coated with catalyst.

In step a), the precursor of Pt may be in the form of a chloride, nitrate, ammonia complex, or ammine complex hydroxide solution or in the form of highly dispersed colloidal metal dispersion. The precursors of Pd and Rh may be in the form of a chloride, nitrate, acetate, ammonia, or ammine complex hydroxide solution, or in the form of a highly dispersed colloidal metal dispersion. In a preferred embodiment, Pt and another PGM element such as Rh in step a) may be separately mixed with other components to form separate aqueous slurries and coated onto the filter sequentially.

The other components in step a) may be independently selected from the group consisting of function-promoting base metal oxides, transition group metals, and binding materials. Non-limiting examples of such materials include alkaline earth metal oxides (e.g., magnesium oxide, calcium oxide, strontium oxide and barium oxide); rare earth metal oxides (e.g., ceria oxide, dysprosium oxide, erbium oxide, europium oxide, gadolinium oxide, holmium oxide, lanthanum oxide, lutetium oxide, neodymium oxide, praseodymium oxide, promethium oxide, samarium oxide, scandium oxide, terbium oxide, thulium oxide, ytterbium oxide and yttrium oxide); transition metal oxides (e.g., titanium oxide, zirconium oxide, vanadium oxide, manganese oxide, iron oxide, nickel oxide, copper oxide, zinc oxide, niobium oxide, molybdenum oxide, silver oxide, hafnium oxide and tungsten oxide); and alumina-, titania-, silica-, ceria- or zirconia-based binding materials. Combinations of such materials are also expressly contemplated by the invention.

The calcination temperature in step c) could be from 250° C. to 1000° C., preferably from 300° C. to 700° C., more preferably from 450° C. to 650° C. The calcination period may be from 10 minutes to 10 hours, preferably 0.5 hour to 8 hours, more preferably 1 hour to 4 hours.

In certain embodiments, gasoline engine exhaust is passed through a GPF coated with a catalyst of the invention containing a catalytically effective amount of PGM and oxidative base metal catalysts at a space velocity of, for example, up to 80,000 $hr^{-1}$ to generate $NO_2$ oxidant in the exhaust gas under a lean NF condition. A "catalytic effective amount" of PGM herein means the PGM amount making a substantial reduction or conversion of unburned HC, CO and $NO_x$ in the gasoline engine exhaust gas passing through the exhaust after-treatment system as well as generate $NO_2$ oxidant in sufficient quantities to oxidize particulate matter trapped on the filter. In certain exemplary embodiments, for example, the amount of PGM is sufficient to cause reduction or conversion of the HC, CO and $NO_x$ in the gasoline engine exhaust gas passing through the exhaust after-treatment system of at least about 40%, about 50%, about 60%, about 70%, or about 80%. In certain preferred embodiments, the amount of PGM is sufficient to cause significant reduction or conversion of the HC, CO and $NO_x$ in the gasoline engine exhaust gas passing through the exhaust after-treatment system of at least 90%, preferably 95%, and more preferably 98%. It is to be understood that a chosen "catalytically effective amount" of PGM may vary depending on the emissions standards of a particular region in which the engine is used. Exemplary PGM loadings suitable for use in the catalysts of the invention may be in the range of at least about 0.01 wt. %, about 0.02 wt %, about 0.04 wt. %, about 0.5 wt. % up to about 1 wt. %, about 1.5 wt %, about 2 wt. %, about 2.5 wt. %, about 3 wt. %, or about 4 wt. % based on the calcined weight of the catalyst. It is to be understood that each lower endpoint and each higher endpoint disclosed in the foregoing may be combined to form a PGM loading range that is expressly contemplated by the invention. The space velocity of the gas through a GPF coated with a catalyst of the invention can be widely varied depending on other operating conditions, e.g., the nature of the catalyst composition.

In one or more embodiments, the catalysts of the invention contain PGM with a total precious metal loading in the range of 5 to 25 $g/ft^3$, preferably 10 to 20 $g/ft^3$, based on the weight of PGM over the volume of the filter.

Typically, the catalysts of the invention are loaded onto a GPF at a loading in the range of at least about 5 g/L, about 10 g/L, about 15 g/L, about 20 g/L, about 25 g/L or about 30 g/L up to about 150 g/L, about 175 g/L, about 200 g/L, about 225 g/L, about 250 g/L about 275 g/L, about 300 g/L or about 325 g/L. It is to be understood that each lower endpoint and each higher endpoint disclosed in the foregoing may be combined to form a catalyst loading range that is expressly contemplated by the invention. In certain exemplary embodiments, the catalyst loading is in the range 10 g/L to 300 g/L or 30 g/L to 200 g/L.

Typically, the exhaust gas from a gasoline engine passes through a GPF comprising a catalyst of the invention under low temperature conditions. In this context, "low temperature" refers to a temperature less than about 550° C., but still sufficiently high to cause catalytic formation of the $NO_2$ oxidant from the exhaust gas using a catalyst of the invention. In certain exemplary embodiments, the exhaust gas from gasoline engine passes through a GPF comprising a catalyst of the invention at a low temperature in the range of about 250° C. to about 550° C., more preferably in the range of about 350° C. to about 550° C., and most preferably in a range of about 350° C. to about 500° C.

In one aspect, the present invention provides the following exemplary embodiments.

1. A catalyst comprising Pt and at least one hydrothermally stable support material, wherein the Pt and the at least one hydrothermally stable support material is disposed on a gasoline particulate filter, wherein the Pt is present in a catalytically effective amount to convert $NO_x$, CO and hydrocarbons in an exhaust gas to $N_2$, $CO_2$ and $H_2O$ and to cause the oxidation of particulate matter trapped on the gasoline particulate filter.

2. A catalyst for gasoline engine exhaust gas aftertreatment, wherein said catalyst is coated onto a gasoline particulate filter and the catalyst comprises:
   a) Pt;
   b) at least one hydrothermally stable support material selected from alumina, zirconia, ceria, silica, titania, a rare earth metal oxide other than ceria, and mixtures thereof;
   c) optionally at least one other platinum group metal selected from Rh, Pd, Ru, Ir and mixtures thereof; and
   d) optionally at least one transition group metal selected from Mn, Fe, Co, Ni, Cu and mixtures thereof.

3. A catalyst according to item 2, wherein said catalyst comprises:
   a) Pt;
   b) Rh;
   c) at least one hydrothermally stable support material selected from alumina, zirconia, ceria, silica, titania, a rare earth metal oxide other than ceria, and mixtures thereof;
   d) optionally at least one other platinum group metal selected from Pd, Ru, Ir and mixtures thereof; and
   e) optionally at least one transition group metal selected from Mn, Fe, Co, Ni, Cu and mixtures thereof.

4. A catalyst according to item 3, wherein said catalyst comprises:
   a) 0.01-3 wt. % Pt, based on the calcined weight of the catalyst;
   b) 0.02-3 wt. % Rh, based on the calcined weight of the catalyst;
   c) 70-99 wt. % of at least one hydrothermally stable support material selected from alumina, zirconia, ceria, silica, titania, a rare earth metal oxide other than ceria, and mixtures thereof, based on the calcined weight of the catalyst;
   d) optionally at least one other platinum group metal selected from Pd, Ru, Ir and mixtures thereof; and
   e) optionally at least one transition group metal selected from Mn, Fe, Co, Ni, Cu and mixtures thereof.

5. A catalyst according to item 4, wherein said catalyst comprises:
   a) 0.02-1 wt. % Pt, based on the calcined weight of the catalyst;
   b) 0.04-1 wt. % Rh, based on the calcined weight of the catalyst;
   c) 80-99 wt. % of at least one hydrothermally stable support material selected from alumina, zirconia, ceria, silica, titania, a rare earth metal oxide other than ceria, and mixtures thereof, based on the calcined weight of the catalyst;
   d) optionally at least one other platinum group metal selected from Pd, Ru, Ir and mixtures thereof; and
   e) optionally at least one transition group metal selected from Mn, Fe, Co, Ni, Cu and mixtures thereof.

6. A catalyst according to any one of items 2 to 5, wherein said catalyst comprises 0.01-4 wt. %, preferably 0.02-2.5 wt. %, and more preferably 0.05-2 wt. % Pd, based on the calcined weight of the catalyst.

7. A catalyst according to any one of items 2 to 6, wherein the weight ratio of Pt:Rh is in the range of 0.1 to 10, preferably 0.5 to 3, and more preferably 1.5 to 3, inclusive.

8. A catalyst according to any one of items 2 to 7, wherein the weight ratio of Pt:Pd is greater than or equal to 0.1, preferably greater than or equal to 0.5, more preferably greater than or equal to 1.

9. A catalyst according to any one of items 2 to 8, wherein said catalyst is coated onto the gasoline particulate filter along the whole of or part of its axial length or radial direction, on alternating channels, on a wall or in a porous wall, or a combination thereof.

10. A catalyst according to any one of items 2 to 9, wherein the gasoline particulate filter is a wall-flow filter having a honeycomb structure.

11. A catalyst according to any one of items 2 to 10, wherein the mean pore size of gasoline particulate filter is from 10 to 24 μm, preferably 14 to 20 μm.

12. A process for preparing the catalyst of any one of items 1 to 11, wherein said process comprises the steps of:
   a) impregnating Pt and optionally at least one other PGM element such as Rh, Pd, Ru and Ir (optionally using one or more precursors thereof) onto the hydrothermally stable support material with sufficient water to achieve incipient wetness and optionally to dilute and/or mix with one or more materials independently selected from the group consisting of base metal oxides, transition group metals, binding materials and combinations thereof and/or precursors thereof to form an aqueous slurry;
   b) milling and coating the slurry onto the gasoline particulate filter.
   c) calcining the gasoline particulate filter coated with catalyst.

13. A process for preparing a catalyst according to any one of items 1 to 11, wherein said process comprises the steps of:
   a) impregnating Pt and optionally one or more other PGM elements such as Pd, Ru, or Ir (optionally using one or more precursors thereof) onto a support material with sufficient water to achieve incipient wetness, and optionally to dilute and/or mix with one or more materials independently selected from the group consisting of base metal oxides, transition group metals, and binding materials and combinations thereof and/or precursors thereof to form a first aqueous slurry;
   b) impregnating Rh and optionally one or more other PGM elements, such as Pd, Ru, or Ir (optionally using one or more precursors thereof) onto a support material with sufficient water to achieve incipient wetness and optionally to dilute and/or mix with one or more materials independently selected from the group consisting of base metal oxides, transition group metals, and binding materials and combinations thereof and/or precursors thereof to form a second aqueous slurry;
   c) milling and coating the second slurry onto the gasoline particulate filter;
   d) calcining the gasoline particulate filter coated with catalyst;
   e) milling and coating the first slurry onto the gasoline particulate filter;
   f) calcining the gasoline particulate filter coated with catalyst.

14. A process according to item 13, wherein the weight ratio of Pt:Pd in step a) is greater than or equal to 0.1, preferably greater than or equal to 0.5, and more preferably greater than or equal to 1.

15. A catalyst obtainable by the process of any one of items 12 to 14.
16. A method for aftertreatment of gasoline engine exhaust gas using a catalyst according to any one of items 1 to 11 and 15, wherein said catalyst converts NO to $NO_2$ for oxidizing the PM when the gasoline engine is operated at a Lambda range greater than or equal to 1.01, preferably greater than or equal to 1.03, more preferably in a range from 1.03 to 1.1.
17. A method for aftertreatment of gasoline engine exhaust gas using a catalyst according to any one of items 1 to 11 and 15, wherein said method comprises the step of contacting the exhaust gas with the catalyst according to any one of items 1 to 11 and 15.
18. A gasoline engine exhaust gas purification system, wherein said exhaust gas purification system comprises the catalyst according to any one of items 1 to 11 and 15, and at least one TWC, preferably said TWC locates at close-couple position.

EXAMPLES

The following examples are provided to illustrate the invention, but by no means are a limitation to the invention.

The Filter used in the Examples P1 to P5 are NGK C810 wall-flow cordierite filter (4.66"×4.66"×6", 240 mesh, wall thickness: 9.5 milli-inch).

The stabilized-alumina used in the Examples P1 to P5 is from Sasol, ceria and zirconia-rare earth metal oxide composites used in the Examples P1 to P5 are from Solvay.

Example P1: Blank Filter

Example P2

Pd (5 g/ft$^3$) and Rh (5 g/ft$^3$) in the form of nitrate solutions were impregnated by P-mixer onto the stabilized-alumina, ceria and zirconia-rare earth metal oxide composites with sufficient water for dilution to achieve incipient wetness. These Pd and Rh-containing powders were mixed with barium nitrate and zirconium nitrate aqueous solutions, and formed an aqueous slurry. The slurry was milled and coated onto the filter. After coating, the filter and the catalyst were calcined at a temperature of 450° C. for 2 hours. The catalyst contained gamma alumina, zirconium oxide, ceria oxide, barium oxide, lanthanum oxide, neodymium oxide, yttrium oxide, Pd and Rh at the concentrations of 24.8%, 32.3%, 27.4%, 4.6%, 1.4%, 3.4%, 5.5%, 0.3% and 0.3%, respectively, based on the calcined weight of the catalyst.

Example P3

Pt (8 g/ft$^3$) in the form of an ammine complex hydroxide solution, Pd (7 g/ft$^3$) and Rh (5 g/ft$^3$) in the form of nitrate solutions, were impregnated by P-mixer onto the stabilized-alumina, ceria and zirconia-rare earth metal oxide composites with sufficient dilution water to achieve incipient wetness. These Pt, Pd and Rh-containing powders were mixed with barium nitrate and zirconium nitrate aqueous solutions, and formed an aqueous slurry. The slurry was milled and coated onto the filter. After coating, the filter and the catalyst were calcined at a temperature of 450° C. for 2 hours. The catalyst contained gamma alumina, zirconium oxide, ceria oxide, barium oxide, lanthanum oxide, neodymium oxide, yttrium oxide, Pt, Pd and Rh at the concentrations of 29.5%, 26.1%, 31.6%, 3.7%, 1.1%, 2.7%, 4.4%, 0.4%, 0.3% and 0.2%, respectively, based on the calcined weight of the catalyst.

Example P4

Pt (8 g/ft$^3$) in the form of an ammine complex hydroxide solution, and Pd (7 g/ft$^3$) or Rh (5 g/ft$^3$) in the form of nitrate solutions were impregnated by P-mixer onto the stabilized-alumina, ceria and zirconia-rare earth metal oxide composites with sufficient water for dilution to achieve incipient wetness. Two types of powders were formed: a Pd—Rh mixed powder ("powder A") and a Pt—Pd mixed powder ("powder B"). Powder A and powder B were mixed with barium nitrate and zirconium nitrate aqueous solutions, and formed aqueous slurry A and slurry B, respectively. Both slurries were milled before coating onto the filter. The filter was coated first with slurry A starting at the outlet side of the filter, calcined at a temperature of 450° C. for 2 hours; and coated again with slurry B starting at the inlet side of the filter and calcined at a temperature of 450° C. for 2 hours. The slurry A comprised gamma alumina, zirconium oxide, ceria oxide, barium oxide, lanthanum oxide, neodymium oxide, yttrium oxide, Pd and Rh at concentrations of 24.8%, 32.3%, 27.4%, 4.6%, 1.4%, 3.4%, 5.5%, 0.3% and 0.3%, respectively. The slurry B comprised gamma alumina, zirconium oxide, ceria oxide, Pt and Pd at the concentrations of 48.1%, 1.4%, 48.1%, 1.9% and 0.5%, respectively. The washcoat loading coated from inlet and outlet after calcination was at a weight ratio of 1:4.

Example P5

Pt (4 g/ft$^3$) in the form of an ammine complex hydroxide solution, and Pd (6 g/ft$^3$) and Rh (5 g/ft$^3$) in the form of nitrate solutions, were impregnated by P-mixer onto the stabilized-alumina, ceria and zirconia-rare earth metal oxide composites with sufficient dilution water to achieve incipient wetness. Two types of powders were formed: a Pd—Rh mixed powder (powder A) and a Pt—Pd mixed powder ("powder B"). Powder A and powder B were mixed with barium nitrate and zirconium nitrate aqueous solutions, and formed aqueous slurry A and slurry B, respectively. Both slurries were milled before coating onto the filter. The filter was coated first with slurry A starting at the outlet side of the filter, calcined at a temperature of 450° C. for 2 hours; and coated again with slurry B at the inlet side of the filter, and calcined at a temperature of 450° C. for 2 hours. The slurry A comprised gamma alumina, zirconium oxide, ceria oxide, barium oxide, lanthanum oxide, neodymium oxide, yttrium oxide, Pd and Rh at the concentrations of 24.8%, 32.3%, 27.4%, 4.6%, 1.4%, 3.4%, 5.5%, 0.3% and 0.3%, respectively. The slurry B comprised gamma alumina, zirconium oxide, ceria oxide, Pt and Pd at the concentrations of 48.7%, 1.4%, 48.7%, 1.0%, and 0.2%, respectively. The washcoat loadings coated at the inlet and outlet after calcination were at a weight ratio of 1:4.

Evaluation:

Prior to evaluation on engine, the coated filters of Examples P1 to P5 were loaded with approximately 10 g of soot, respectively, on a Geely 2.0 L PFI engine running at 2000 rpm under full duty work conditions for 2 hours. The exact amount of soot loaded was recorded as the difference in hot weight of the filter prior to and after soot-loading events. The evaluations were performed on an SGE 1.5 L Turbo-GDI bench-engine using the following procedure:

1. Temperature was ramped under rich NF conditions to 450° C. (inlet temperature of the filter) to avoid soot burning;

2. Engine was run at lambda=1.05 at 450° C. (inlet temperature of the filter) for 30 min. Mass flow rate through the filter was 66 kg/h. During this period, the pressure drops between the two pressure sensors located in front of and after the filter were monitored; ΔP % (BP reduction in percentage) was defined as:

$$\Delta P\% = \frac{BP(t) - BP(t_{blank})}{BP(t_0) - BP(t_{blank})} \times 100\%$$

ΔP % measures the soot consumption rate under experimental conditions. The higher the number of ΔP % is, the faster rate at which accumulated soot was oxidized.

Here, $BP(t)$=pressure drop across the filter (loaded with soot) at 30 min, measured on engine bench at 450° C. and mass flow rate of 66 kg/h;

$BP(t_0)$=pressure drop across the filter (loaded with soot) at time t=0, measured on engine bench at 450° C. and mass flow rate of 66 kg/h;

$BP(t_{blank})$=pressure drop across the filter (coated or blank), without loaded soot, measured on engine bench at same temperature and flow rate.

The results of the evaluation are showed in FIG. 1. Per the evaluation results, it was found that a blank filter had no significant ability to oxide the soot trapped in the filter under 450° C. and lean NF conditions. By comparison, the catalyst with Pt/Pd/Rh significantly increased the soot oxidization rate. The catalyst separately coated with Pt in the inlet of the substrate further increased the soot oxidization rate. The catalyst with Pt/Rh=1.6 showed much higher soot oxidization compared to a catalyst with Pt/Rh=0.8.

Examples P6-P11

The filter used in the Examples P6 to P11 are CNG GC HP 1.1 wall-flow cordierite filter (4.66"×4.66"×4", 300 mesh, wall thickness: 8.5 milli-inch). Core samples were drilled from center of the coated filter and plug area was removed equally from both ends to give a flow-through core sample with 1"×1"×3" in size, 300 mesh, wall thickness: 8.5 milli-inch).

The stabilized-alumina used in the Examples P6 to P11 is from Sasol, ceria and zirconia-rare earth metal oxide composites used in the Examples P6 to P11 are from Solvay.

General Procedure for Coated Filter Preparation of Examples P6-P11

Pt in the form of an ammine complex hydroxide solution, Pd and Rh in the form of nitrate solutions, were impregnated by P-mixer onto the stabilized-alumina, ceria and zirconia-rare earth metal oxide composites with sufficient dilution water to achieve incipient wetness. These Pt, Pd and Rh-containing powders were mixed with barium nitrate and zirconium nitrate aqueous solutions and formed an aqueous slurry. The slurry was milled and coated onto the filter from inlet end of the filter. After coating, the filter and the catalyst were calcined at a temperature of 450° C. for 2 hours before core sample was drilled from the filter. Catalyst composition for Examples P6 to P11 is listed in Table 1, the weight percent is based on the calcined weight of the catalyst, the loading is based on the weight of precious metal, i.e. Pt, Pd and Rh, over the volume of the filter.

TABLE 1

Catalyst composition for Examples P6 to P11.

| Example | P6 | P7 | P8 | P9 | P10 | P11 |
|---|---|---|---|---|---|---|
| $CeO_2$ wt. % | 25.8 | 31.7 | 35.8 | 35.8 | 40.0 | 44.2 |
| $ZrO_2$ wt. % | 26.1 | 28.0 | 20.8 | 20.8 | 13.7 | 7.6 |
| $Al_2O_3$ wt. % | 37.6 | 29.8 | 34.9 | 34.9 | 39.9 | 43.8 |
| BaO wt. % | 1.8 | 1.8 | 1.8 | 1.8 | 1.8 | 1.8 |
| $La_2O_3$ wt. % | 1.1 | 1.1 | 0.8 | 0.8 | 0.5 | 0.3 |
| $Nd_2O_3$ wt. % | 2.7 | 2.7 | 2.1 | 2.1 | 1.4 | 0.7 |
| $Y_2O_3$ wt. % | 4.4 | 4.4 | 3.3 | 3.3 | 2.2 | 1.1 |
| Pt wt. % | 0.19 | 0.19 | 0.19 | 0.23 | 0.19 | 0.19 |
| Pd wt. % | 0.05 | 0.05 | 0.05 | 0.00 | 0.05 | 0.05 |
| Rh wt. % | 0.23 | 0.23 | 0.23 | 0.23 | 0.23 | 0.23 |
| Pt g/ft³ | 8 | 8 | 8 | 10 | 8 | 8 |
| Pd g/ft³ | 2 | 2 | 2 | 0 | 2 | 2 |
| Rh g/ft³ | 10 | 10 | 10 | 10 | 10 | 10 |

Evaluation on Examples P6-P11

Figure 2:
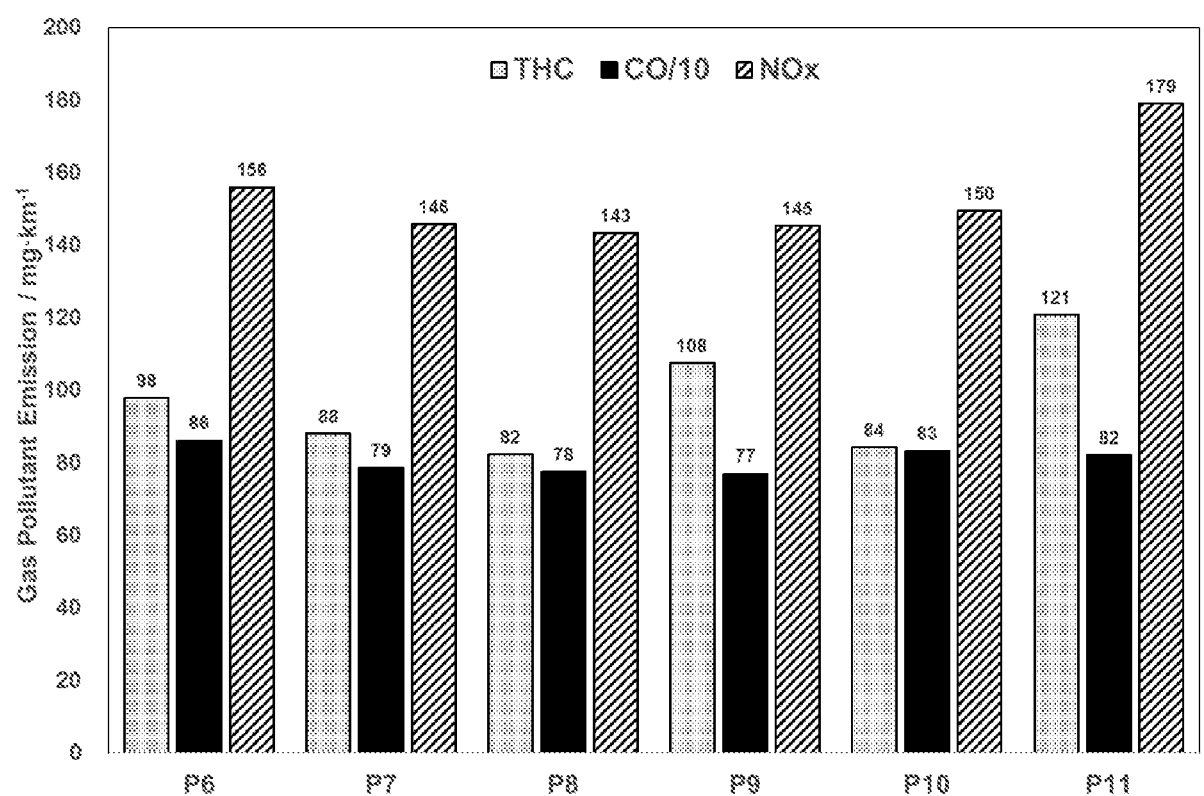
FIG. 2 shows gas phase pollutant emission under WLTC cycle.
Figure 3:
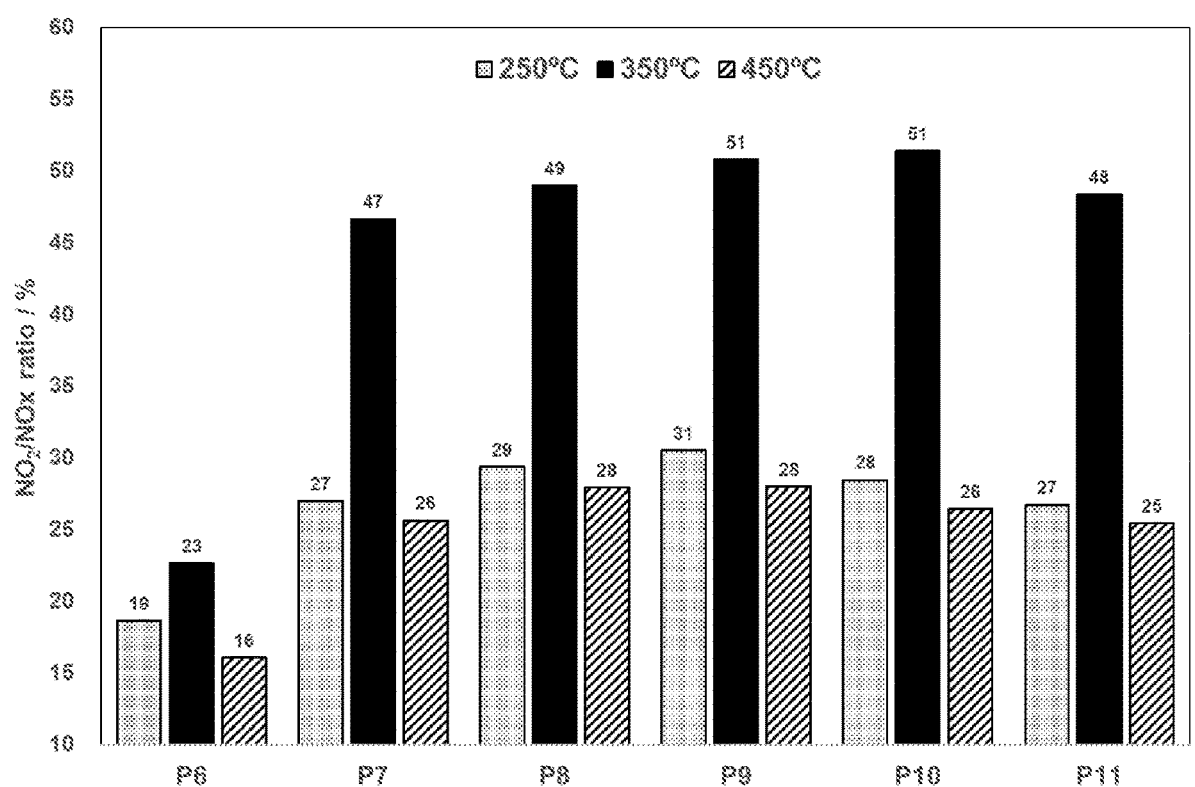
FIG. 3 shows $NO_2$ generation ability under slight lean condition ($\lambda=1.05$).

Prior to performance evaluation, the core samples of Examples P6 to P11 were hydrothermally aged at 850° C. for 36 hours under alternating lean and rich atmosphere. Three-way conversion activity of the samples (i.e. conversion of HC, CO and NOx) was evaluated on a gasoline vehicle simulation reactor under WLTC cycle. Samples' low temperature soot burning activity, assessed by its capability to generate $NO_2$ under slight lean conditions, was tested on the same reactor using the following procedure:

1) Catalyst pretreatment: space velocity 18,000 h$^{-1}$, 20 ppm HC (as C1), 40 ppm CO, 150 ppm NO, 10% $H_2O$, 14% $CO_2$, lambda=1.05, balance $N_2$, catalyst inlet temperature 500° C. for 30 min;

2) Lambda 1.05: space velocity 18,000 h$^{-1}$, 20 ppm HC (as C1), 40 ppm CO, 150 ppm NO, 10% $H_2O$, 14% $CO_2$, lambda=1.05, balance $N_2$, catalyst inlet temperature ramping from 250 to 500° C. at the ramp rate of 20° C. min$^{-1}$;

The results of the evaluations are shown in FIGS. 2 & 3. Per the three-way conversion activity evaluation results, it was found that all examples (P6 to P11) showed similar CO conversion activity, Example P11 showed worse NOx activity than other examples, and Example P9, sample with no Pd, showed worse HC activity than other examples. Per the $NO_2$ generation (reflecting low temperature soot regeneration activity) evaluation results, it was found that only Example P6, sample with lowest ceria content, showed significantly poorer $NO_2$ generation under slight lean atmosphere. In sum, Examples P7, P8, and P10 showed both good three-way conversion activity and good $NO_2$ generation activity, necessary for effective low-temperature soot burning.

What is claimed is:

1. A catalyst, comprising:

Pt, a hydrothermally stable support material, and at least one functional additive chosen from magnesium oxide, calcium oxide, strontium oxide, barium oxide, gallium oxide, indium oxide, germanium oxide, antimony oxide, and mixtures thereof, wherein the Pt and the hydrothermally stable support material are disposed on a gasoline particulate filter, and the Pt is present in a catalytically effective amount to convert $NO_x$, CO, and hydrocarbons in an exhaust gas to $N_2$, $CO_2$, and $H_2O$ and to cause oxidation of particulate matter trapped on the gasoline particulate filter.

2. A catalyst coated onto a gasoline particulate filter, said catalyst comprising:
Pt;
at least one functional additive chosen from magnesium oxide, calcium oxide, strontium oxide, barium oxide, gallium oxide, indium oxide, germanium oxide, antimony oxide, and mixtures thereof;
a hydrothermally stable support material chosen from alumina, zirconia, ceria, silica, titania, a rare earth metal oxide other than ceria, and mixtures thereof;
optionally a platinum group metal chosen from Rh, Pd, Ru, Ir, and mixtures thereof; and
optionally a transition group metal chosen from Mn, Fe, Co, Ni, Cu, and mixtures thereof.

3. The catalyst of claim 2, further comprising:
Rh; and
optionally a platinum group metal chosen from Pd, Ru, Ir, and mixtures thereof.

4. The catalyst of claim 3, wherein the catalyst comprises:
from 0.01 wt. % to 3 wt % Pt, based on a calcined weight of the catalyst;
from 0.02 wt. % to 3 wt. % Rh, based on the calcined weight of the catalyst;
from 70 wt. % to 99 wt. % of the hydrothermally stable support material chosen from alumina, zirconia, ceria, silica, titania, a rare earth metal oxide other than ceria, and mixtures thereof, based on the calcined weight of the catalyst.

5. The catalyst of claim 4, wherein the catalyst comprises:
from 0.02 wt. % to 1 wt. % Pt, based on the calcined weight of the catalyst;
from 0.04 wt. % to 1 wt. % Rh, based on the calcined weight of the catalyst;
from 80 wt. % to 99 wt. % of the hydrothermal stable support material chosen from alumina, zirconia, ceria, silica, titania, a rare earth metal oxide other than ceria, and mixtures thereof, based on the calcined weight of the catalyst.

6. The catalyst of claim 2, wherein the catalyst comprises from 0.01 wt. % to 4 wt. % Pd, based on a calcined weight of the catalyst.

7. The catalyst of claim 2, wherein a weight ratio of Pt:Rh ranges from 0.1 to 10, inclusive.

8. The catalyst of claim 2, wherein a weight ratio of Pt:Pd is greater than or equal to 0.1.

9. The catalyst of claim 2, wherein the catalyst is coated onto the gasoline particulate filter along the whole of or a part of an axial length or radial direction of the gasoline particular filter, on alternating channels, on a wall or in a porous wall, or a combination thereof.

10. The catalyst of claim 2, wherein the gasoline particulate filter comprises a wall-flow filter comprising a honeycomb structure.

11. The catalyst of claim 2, wherein a mean pore size of the gasoline particulate filter is from 10 μm to 24 μm.

12. A process for preparing the catalyst of claim 1, said process comprising:
a) impregnating Pt and optionally a platinum group metal chosen from Rh, Pd, Ru, and Ir, optionally using one or more precursors thereof, onto the hydrothermally stable support material with sufficient water to achieve incipient wetness, adding at least one functional additive chosen from magnesium oxide, calcium oxide, strontium oxide, barium oxide, gallium oxide, indium oxide, germanium oxide, antimony oxide, and mixtures thereof, and optionally to dilute and/or mix with one or more materials independently chosen from transition group metals, binding materials and combinations thereof and/or precursors thereof, to form an aqueous slurry;
b) milling and coating the aqueous slurry onto the gasoline particulate filter; and
c) calcining the gasoline particulate filter coated with the aqueous slurry.

13. A process for preparing the catalyst of claim 1, the process comprising:
a) impregnating Pt and optionally a platinum group metal chosen from Pd, Ru, and Ir, optionally using one or more precursors thereof, onto the hydrothermally stable support material with sufficient water to achieve incipient wetness, adding at least one functional additive chosen from magnesium oxide, calcium oxide, strontium oxide, barium oxide, gallium oxide, indium oxide, germanium oxide, antimony oxide, and mixtures thereof, and optionally to dilute and/or mix with one or more materials independently chosen from transition group metals, and binding materials and combinations thereof and/or precursors thereof, to form a first aqueous slurry;
b) impregnating Rh and optionally a platinum group metal chosen from Pd, Ru, and Ir, optionally using one or more precursors thereof, onto the hydrothermally stable support material with sufficient water to achieve incipient wetness and optionally to dilute and/or mix with one or more materials independently chosen from base metal oxides, transition group metals, and binding materials and combinations thereof and/or precursors thereof, to form a second aqueous slurry;
c) milling and coating the second aqueous slurry onto the gasoline particulate filter;
d) calcining the gasoline particulate filter coated with the second aqueous slurry;
e) milling and coating the first aqueous slurry onto the gasoline particulate filter; and
f) calcining the gasoline particulate filter coated with the first aqueous slurry.

14. The process of claim 13, wherein a weight ratio of Pt:Pd in a) is greater than or equal to 0.1.

15. A catalyst prepared according to the process of claim 12.

16. A method for after treating an exhaust gas of a gasoline engine, said method comprising converting, with the catalyst of claim 1, NO to $NO_2$ for oxidizing particulate matter when the gasoline engine is operated at a Lambda range above 1.01.

17. A method for after treating an exhaust gas of gasoline engine, said method comprising contacting the exhaust gas with the catalyst of claim 1.

18. A gasoline engine exhaust gas purification system, comprising the catalyst of claim 1, and a three-way convertor (TWC).

* * * * *